United States Patent [19]

Saeva

[11] 3,942,870
[45] Mar. 9, 1976

[54] LIQUID CRYSTALLINE OPTICAL FILTER

[75] Inventor: Franklin D. Saeva, Webster, N.Y.

[73] Assignee: Xerox Corporation, Stamford, Conn.

[22] Filed: Apr. 29, 1974

[21] Appl. No.: 465,048

[52] U.S. Cl. ........... 350/150; 350/154; 350/160 LC
[51] Int. Cl.² ......................................... G01F 1/13
[58] Field of Search ...... 350/150, 151, 154, 160 LC

[56] References Cited
UNITED STATES PATENTS
3,697,150  6/1972  Wysocki ................... 350/160 LC X
3,780,307  12/1973  Saeva et al. ............. 350/160 LC UX

*Primary Examiner*—Alfred E. Smith
*Assistant Examiner*—Matthew W. Koven
*Attorney, Agent, or Firm*—James J. Ralabate; Michael H. Shanahan; George J. Cannon

[57] ABSTRACT

The optical transitions of extrinsically optically active insoluble materials become optically active and circularly dichroic when in contact with optically negative liquid crystalline materials thereby providing unusual and highly advantageous properties. The circularly dichroic optical properties induced in the extrinsically optically active insoluble materials can be utilized for optical filter applications.

11 Claims, 4 Drawing Figures

LIQUID CRYSTALLINE OPTICAL FILTER

BACKGROUND OF THE INVENTION

This information relates to liquid crystalline materials and, more specifically, to uses of compositions comprising optically negative liquid crystalline materials and insoluble extrinsically optically active materials which become optically active when in contact with optically negative liquid crystalline materials.

Liquid crystalline substances exhibit physical characteristics, some of which are typically associated with liquids and others which are typically unique to solid crystals. The name "liquid crystals" has become generic to substances exhibiting these duals properties. Liquid crystals are known to appear in three different forms: the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance, it is split into two polarized components whose transverse vibrations are at right angles to each other. The two components are transmitted at different velocities through the substance and emerge as beams of polarized light. By the term "liquid crystalline substances which have optically negative characteristics", as used herein, is meant those for which the extraordinary index of refraction $\eta_E$ is smaller than the ordinary index of refraction $\eta_o$. Cholesteric liquid crystal substances exhibit this property. For a detailed description of this phenomenon, see Optical Crystallography, Wahlstrom, Fourth Edition, Wiley and Sons, Inc., New York.

The molecules in cholesteric liquid crystals are arranged in very thin layers with the long axes of the molecules parallel to each other and to the plane of the layers within each layer. Because of the asymmetry and steric nature of the molecules, the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in Molecular Structure and the Properties of Liquid Crystals, G.W. Gray, Academic Press, 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_0 = 2np$ with n representing the index of refraction of the liquid crystal substance and p the pitch or repetition distance of the helical structure. The bandwidth $\Delta\lambda_o$ of this wavelength band centered about $\lambda_o$ will typically be of the order of about $\lambda_o/14$. For light of a wavelength $\lambda_o$, the cholesteric liquid crystal, under these conditions, exhibits selective reflection of the light such that approximately 50% of the light is reflected and approximately 50% is transmitted, assuming negligible absorption which is usually the case, with both the reflected and transmitted beams being approximately circularly polarized in opposite directions.

For light having wavelengths around $\lambda_o$ but not at $\lambda_o$, the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean or "disturbed" texture. If $\lambda_o$ is in the visible region of the spectrum, the liquid crystalline film appears to have the color corresponding to $\lambda_o$ and if $\lambda_o$ is outside the visible spectral region, the film appears colorless.

Depending upon the intrinsic rotary sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense of polarization as that intrinsic to the helix. Thus, a cholesteric liquid crystal having an intrinsic helical structure which is left-handed in sense will transmit LHCPL and one having a helical structure which is right-handed in sense will transmit RHCPL.

Hereinafter, these cholesteric liquid crystal substances will be identified in order to conform with popular convention, by the kind of light which is reflected at $\lambda_o$. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely, a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50% transmitting at $\lambda_o$ for these sources when the liquid crystal is in its Grandjean texture.

A further unique optical property of optically negative liquid crystal film is that contrary to the normal situation when light is reflected, such as by mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o = 2np$ is directed at a right-hand film, it is substantially completely reflected and, after reflection, remains RHCPL. If the same light were to be directed on a metallized mirror, in reflected light would be LHCPL.

Because of these optical properties, optically negative liquid crystalline substances have been found to be highly advantageous for use in a number of applications. U.S. Pat. No. 3,669,525 and 3,679,290 disclose the use of such liquid crystalline materials in optical filter systems. U.S. Pat. No. 3,744,920 discloses the use of these materials in a detection system which can identify physical surface and/or electrical conductivity irregularities in a surface of interest.

Extremely large extrinsic circular dichroism has been observed within the electronic transitions of achiral (optically inactive) solutes dissolved in cholesteric mesophases as reported in recently issued U.S. Pat. No. 3,780,304 to F. D. Saeva et al. and in the following articles by F. D. Saeva et al. appearing in the Journal of the American Chemical Society (JACS): "Cholesteric Liquid-Crystal-Induced Circular Dichroism (LCICD) of Achiral Solutes. A Novel Spectroscopic Technique", Vol. 94, JACS, page 5135 (1972); "Cholesteric Liquid-Crystal-Induced Circular Dichroism (LCICD). V. Some Mechanistic Aspects", Vol. 95, JACS, page 7656 (1973); "Cholesteric Liquid-crystal-Induced Circular Dichroism (LCICD). VI. LCICD Behavior of Benzene and Some of its Mono- and Disubstituted Derivatives", Vol. 95, JACS, page 7660 (1973); and "Cholesteric Liquid-Crystal-Induced Circular Dichroism (LCICD). VII. LCID of Achiral Solutes in Lyotropic Cholesteric Mesophases", Vol. 95, JACS, page 7882 (1973).

Circular dichroism has not been previously reported as induced in extrinsically optically active insoluble materials and it has heretobefore been thought by those working in the art as evidenced by the above articles that two mechanisms were important to the existence of Liquid Crystal Induced Circular Dichroism in dissolved materials: (1) helical organization of solute, and (2) the exposure of solute to a helical organization of liquid crystal molecules. Shortly after the invention of this Application, data was reported which indicated that mechanism (1) was not required for the observation of extrinsic LCICD within solutes in the cholesteric mesophase. That is, the solute molecules need not be ordered into helical organization by the mesophase in order to exhibit liquid crystal induced circular dichroism. The data is reported in "The Optical Activity of Achiral Molecules in a Cholesteric Solvent", J.C.S. Chem. Comm., page 712, 1973.

It is known that the pitch of cholesteric liquid-crystalline substances is responsive to various foreign stimuli such as heat, pressure, electric fields, magnetic fields, etc. In some cases this characteristic is a highly desirable advantage, such as where the substance is used in a detection system to indicate the presence, or a change in the amount present, of any particular stimulus. However, according to some uses of these substances, the fact that their performance is affected by foreign stimuli is not an advantage and it would be desirable to have materials whose performance in a particular mode would be essentially independent of the presence of the above mentioned stimuli.

In rapidly growing areas of technology such as liquid crystals new methods, apparatus, compositions and articles of manufacture are often discovered for the application of the new technology in a new mode. The present invention relates to novel and advantageous uses of extrinsically optically active insoluble materials in contact with optically negative liquid crystalline materials.

SUMMARY OF THE INVENTION

It is, therefore, an object of this invention to provide an optical system having the above mentioned desirable features.

It is another object of the invention to provide an optical system employing optically negative liquid crystalline compositions which system is operative essentially independently of the presence of foreign stimuli.

It is a further object of the invention to provide an optical system which can be adapted to function as an optical filter system.

It is a still further object of the invention to provide an optical filter system which will permit transmission of one or more selected wavelength bands of incident radiation between and including the ultraviolet and infrared regions of the electromagnetic spectrum while substantially completely rejecting all other wavelengths within the incident radiation.

The above mentioned objects and advantages and others are realized in accordance with the invention by employing optically negative liquid crystalline substances in contact with extrinsically optically active insoluble materials whose electronic transitions, i.e., effect obtained from the interaction of light energy with the electrons of the molecules, become circularly dichroic (i.e., show a large preferential absorption of either LHCPL or RHCPL) when in contact with an optically negative liquid crystalline material. It should be understood that by the term "extrinsically optically active insoluble materials" we mean both intrinsically optically active and intrinsically optically inactive insoluble materials which are optically active or inactive, respectively, out of contact (or when not in contact) with optically negative liquid crystalline substances. Both intrinsically optically active insoluble materials and optically inactive insoluble materials become extrinsically optically active when contacted with an optically negative liquid crystalline material. This extrinsic induced behavior may overwhelm and dominate over any intrinsic activity since the specific rotations and molecular ellipticities in the former case are normally substantially larger than that observed for intrinsically optically active insoluble materials.

"Insoluble" is used herein to mean that dissolution of the material added to or contacted by the optically negative liquid crystalline material can not be detected by conventional photometric techniques, such as circular dichroism and optical absorption.

It has been found that when such extrinsically optically active insoluble materials are placed in or otherwise contacted by cholesteric mesophases, optical activity is induced in the optically inactive materials and they exhibit circularly dichroic behavior within their absorption bands. The optical behavior induced in the normally optically inactive insoluble materials is due to absorption whereas the circularly dichroic behavior of optically negative liquid crystalline substances in the region of $\lambda_o$ is due to selective reflection of one type of circularly polarized light. The insoluble materials which acquire the induced optical activity, as opposed to the optically negative liquid crystalline substances, absorb both RHCPL and LHCPL; however, they show a large preference for one type more than for the other type.

Thus, such insoluble materials may be utilized in devices which can be tuned to the absorption band of the insoluble materials rather than the reflection band of the optically negative liquid crystalline substance; or use may be made of both absorption bands of such insoluble materials and reflection bands of optically negative liquid crystalline materials.

The invention will be more fully understood from the following detailed description of various preferred embodiments thereof particularly when read in conjunction with the accompanying drawings wherein.

Figure 1:
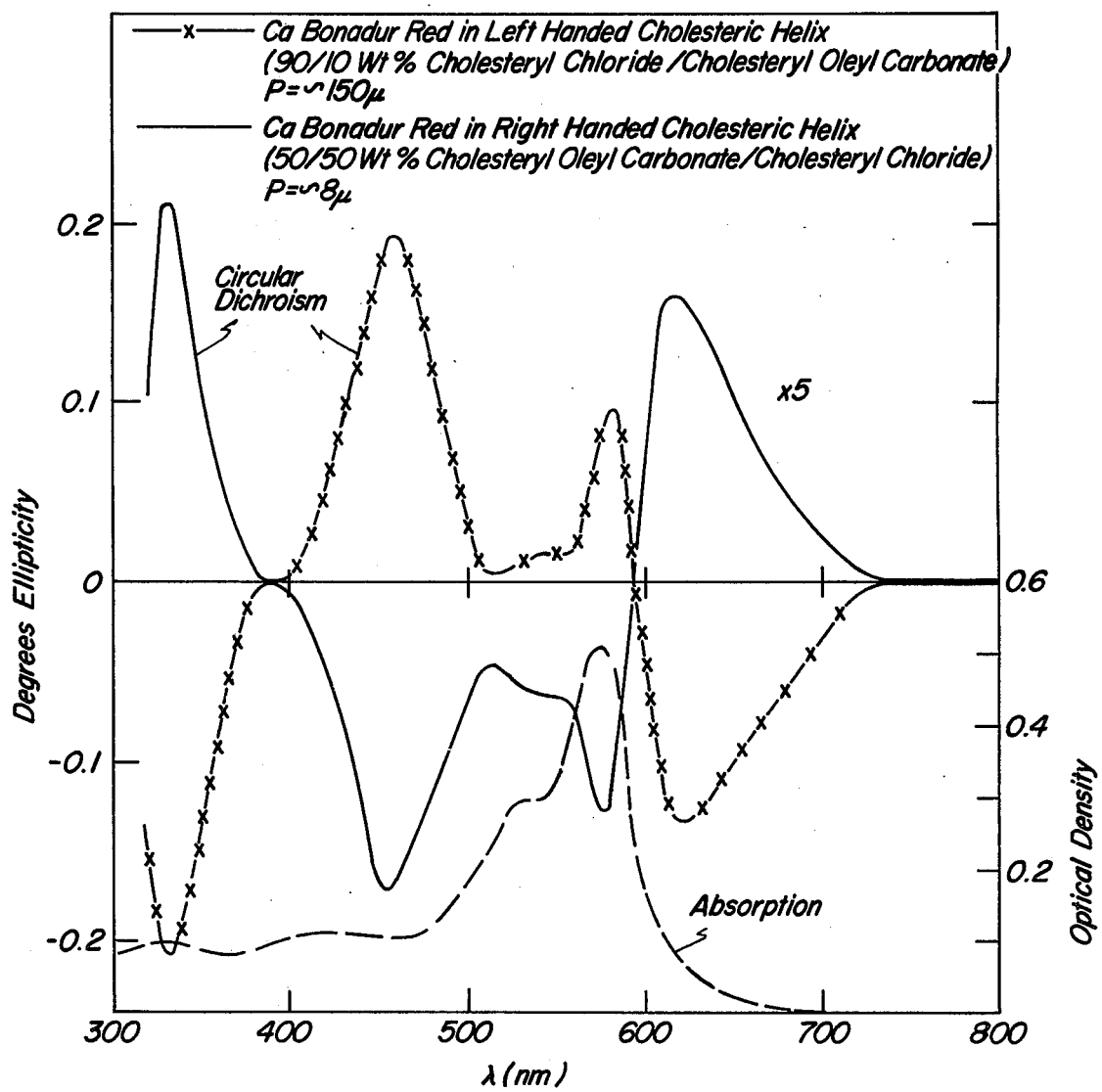
FIG. 1 shows the circular dichroism and absorption spectra of Calcium Bonadur Red particles suspended in the cholesteric mesophases of cholesteryl oleyl carbonate and cholesteryl chloride.

Referring now to FIG. 1, there is seen the circular dichroism and absorption spectrum of a thin film (about 5 microns thick) of insoluble Calcium Bonadur Red pigment particles suspended in the cholesteric mesophases of cholesteryl oleyl carbonate and cholesteryl chloride. The pigment particles are insoluble in the cholesteric mesophase and are much larger in size than the liquid crystal molecules. Surprisingly, it was found that the insoluble particles exhibited liquid crystal induced circular dichroism not withstanding the fact that their large size relative to the molecules of the cholesteric mesophase prevented their being ordered into helical organization by the helical array of molecules of the cholesteric mesophase.

In the right-handed cholesteric helix CD bands of negative sign ($E_R > E_L$) appear at about 450,520, and 580 nm while positive CD bands appear at about 340 and 620 nm. In the left-handed cholesteric helix the above mentioned CD bands are of opposite sign to that found in the right-handed cholesteric helix. A major peak of absorption appears at about 580 nm of light and a shoulder at about 520 nm of light in the absorption spectrum. These wavelengths are within the visible region. The absorption and circular dichroism exhibited within the visible region is attributable solely to circular dichroism induced in the particles. It was further found, as seen from comparing particles sizes in Examples 1 and 2, below, that the phenomenon of circular dichroism induced in the particles may be a surface phenomenon. The ratio of circular dichroism to optical density increases in intensity with increase in surface area provided by the particles. That is, for the same weight amount of insoluble particles suspended in the cholesteric mesophase, a greater ratio is exhibited by smaller sized particles than by larger sized particles. The sign of extrinsic circular dichroism in the particles is independent of the position of the cholesteric pitch band $\lambda_o$.

Figure 2:
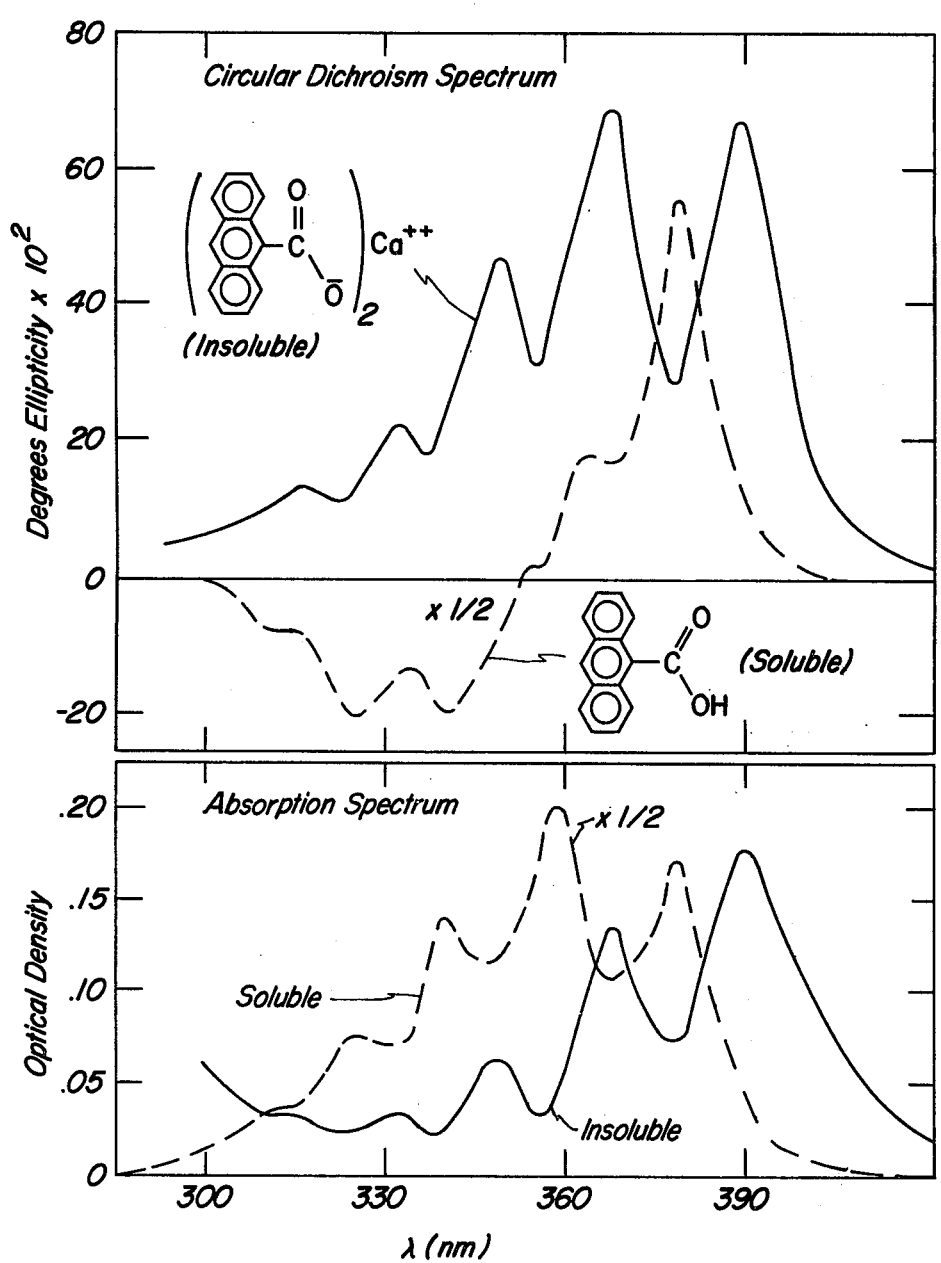
FIG. 2 shows the circular dichroism and absorption spectra of soluble and insolubilized anthracene (9-carboxylic acid in the cholesteric mesophase of cholesteryl chloride (60 wt. %) - cholesteryl nonanoate (40 wt. %).

FIG. 2 presents for comparison the absorption and circular dichroism spectra of soluble and insolubilized anthracene-9-carboxylic acid. It is noted that while the soluble anthracene-9-carboxylic acid in the cholesteric mesophase (60 wt. %) cholesteryl chloride - 40 wt. % cholesteryl nonanoate) exhibits a change in sign in circular dichroism which is dependent upon the position of the cholesteric pitch band $_o$, the insolubilized anthracene-9-carboxylic acid remains positive in sign in circular dichroism ($E_L > E_R$) notwithstanding change in position of the cholesteric pitch band $\lambda_o$. Previously, it was observed with solutes in cholesterics that the sign of circular dichroism induced in the solute was dependent upon the position of $\lambda_o$ relative to solute absorption as well as the handedness of the cholesteric mesophase.

Of course, it will be recognized that the particular insoluble materials of FIGS. 1 and 2 are typical of the insoluble optically inactive materials of the invention and are used to illustrate what effect is obtained; similar results can be obtained with any of the insoluble optically inactive materials encompassed by the invention.

Experimental results with insoluble materials indicate that the intensity of the induced circularly dichroic absorption band varies with variation in pitch of the cholesteric mesophase, as well as with the chirality of the cholesteric helix. The sign of the extrinsic circular dichroism changes with chirality of the cholesteric helix. However, the sign of the extrinsic dichroism is independent of the wavelength location of the optically negative liquid crystalline pitch band $\lambda_o$ relative to the wavelength location of the absorption band of the insoluble material.

An important advantage derived from exploiting the induced circular dichroic optical activity of the absorption band of the insoluble materials contacted with the optically negative liquid crystalline material is that the absorption band will always remain substantially in the same position and will not be shifted to any significant extent by the presence of foreign stimuli. The magnitude of the optically active effect will typically change when a foreign stimulus acts upon the composition but the position of the band will not. This behavior is opposite to that of the pitch band of the optically negative liquid crystalline composition when acted upon by a foreign stimulus since, as is appreciated by those skilled in the art, the location of the pitch band changes but the amplitude thereof is always substantially the same. For example, when a stimulus acts upon the optically negative liquid crystalline environment, the pitch may become larger causing $\lambda_o$ to become larger (since $\lambda_0 = 2np$).

Thus, it can be seen that the addition of extrinsically optically active insoluble materials whose absorption bands become highly optically active when in contact with an optically negative liquid crystalline environment permits a novel and highly advantageous means for tailoring the properties of optically negative liquid crystal systems to achieve novel and extremely useful results. The above mentioned additives can be used to provide a circularly dichroic absorption band for the composition.

The additives which can be placed in contact with optically negative liquid crystalline substances according to the invention should be insoluble (as previously defined) in such a liquid crystalline environment and should have optical transitions which become circularly dichroic in some region of the electromagnetic spectrum. Any suitable extrinsically optically active insoluble material can be used according to the invention. Typical suitable extrinsically optically active insoluble materials include, among others, organic and inorganic pigments, aromatic insoluble compounds such as insolubilized benzene, napthalene, anthracene and the like; insoluble azo compounds such as insolubilized arylazonaphthols, azobenzenes, etc.; insoluble nitro compounds such as insolubilized nitrobenzene, nitroarylazonaphthols and the like; insoluble nitroso compounds such as insolubilized nitrosonaphthalene and the like; insoluble compounds such as insolubilized benzylidene aniline, etc.; insoluble carbonyl compounds such as insolubilized acetone, acetophenone, benzophenone and the like; insoluble thiocarbonyls such as insolubilized thioacetophenones, thioacetone, thiobenzophenone, and the like; insoluble alkenes such as insolubilized butadiene, cyclohexane, etc.; insoluble heterocyclics such as insolubilized furans, aziridines, pyridines and the like, insoluble alkanes such as insolubilized hexane, dodecane and the like; metallic complexes; dyes such as polymethin, sulfur, indigo and anthraquinone dyes; and mixtures thereof.

Typical methods of insolubilizing include adsorbing on suitable surfaces and converting to ionic derivatives.

Generally speaking, it is preferred to use extrinsically optically active additive materials that absorb in the visible region of the spectrum such as, for example, inorganic and organic pigments in the novel compositions of the invention since the colored additives will provide preferred results when the compositions are utilized in various modes of application as will be discussed in detail hereinafter. For example, in a preferred embodiment of the invention where the compositions of the invention are employed in an imaging mode the use of colored additive materials will permit readout in the visible region of the spectrum of an image where the optical input is not in the visible spectral region of the electromagnetic spectrum.

Of course, it should be recognized that the above classes of materials are intended to be illustrative only of the insoluble additives which will provide the previously described induced behavior.

The amount of insoluble material which can be incorporated into an optically negative liquid crystalline can vary over an extremely wide range. The amount added in any particular instance is dependent primarily upon the intended use of the particular composition. For example, where it is intended to exploit the induced optical activity of the absorption band of the additive as little as up to about 10% by weight of optically inactive material can provide the induced optical activity. Of course, the upper limit of the amount of additive which can be incorporated into any particular optically negative liquid crystal composition, and which can go as high as about 90% by weight, is controlled by the requirement that the total environment must retain its optically negative liquid crystal line character after the addition of the optically inactive material.

Any suitable cholesteric liquid crystal substance, mixtures thereof or compositions having liquid crystalline characteristics may be employed in the invention. Typical suitable cholesteric liquid crystals include derivatives from reactions of cholesterol and inorganic acids, for example: cholesteryl chloride, cholesteryl bromide, cholesteryl iodide, cholesteryl fluoride, cholesteryl nitrate; esters derived from reactions of cholesterol and carboxylic acids, for example, cholesteryl crotonate; cholesteryl nonanoate, cholesteryl hexanoate; cholesteryl formate; cholesteryl docosonoate; cholesteryl proprionate; cholesteryl acetate; cholesteryl valerate; cholesteryl vacconate; cholesteryl linolate; cholesteryl linolenate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-1-2-(2-methoxyethoxy) ethyl carbonate; cholesteryl geranyl carbonate; cholesteryl heptyl carbamates; and alkyl amides and aliphatic secondary amines derived from $3\beta$-amino$\Delta 5$-cholestene and mixtures thereof; peptides such as poly-$\gamma$-benzyl-L-glutamate; derivatives of beta sitosterol such as sitosteryl chloride; and amyl ester of cyano benzilidene amino cinnamate. The alkyl groups in said compounds are typically saturated or unsaturated fatty acids, or alcohols, having less than about 25 carbon atoms, and unsaturated chains of less than about 5 double-bonded olefinic groups. Aryl groups in the above compounds typically comprise substituted benzene ring compounds. Any of the above compounds and mixtures thereof may be suitable for cholesteric liquid crystalline materials in the advantageous system of the present invention.

Mixtures of liquid crystals can be prepared in organic solvents such as chloroform, petroleum ether and others, which are typically evaporated from the mixture leaving the liquid crystal composition. Alternatively, the individual components of the liquid crystalline mixture can be combined directly by heating the mixed components above the isotropic transition temperature.

The above lists of typical suitable optically negative liquid crystalline substances are intended to encompass mixtures of the above. These lists are intended to be representative only and are not to be construed as being exhaustive or limiting the invention to the specific materials mentioned. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as those mentioned above will only possess the necessary properties which make them suitable for use according to the invention at some specific temperature range which may be at room temperature or substantially below or above room temperature. However, all of the various substances, mixtures or combinations thereof will function according to the method at some temperature. Typically, the materials of the invention will be used at or near room temperature. Thus, it is preferred to employ liquid crystal substances which have a liquid crystal state at or near room temperature. Generally speaking, the liquid crystal substance will preferably be in the liquid crystal state at the desired operational temperature.

Typical suitable thicknesses of films or layers of optically negative liquid crystalline material are from about 0.5 to about 50 microns, although any thickness which will provide the desired effect can be used.

The invention will now be described further in detail by way of example, it being understood that these are intended to be illustrative only and the invention is not limited to the conditions, materials, procedures, etc., recited therein. All parts and percentages listed are by weight unless otherwise specified.

EXAMPLE I

The calcium salt of 3'-ethyl-4'-chloro-6'-sulfonyl-phenylazo-2-hydroxy-3-naphthoic acid (Calcium Bonadur Red) is finely ground between two pieces of ground glass to an average particle size of about 10 microns. About 0.1 gm. of the particles are uniformly dispersed in about 11 gm. of the cholesteric mesophase of cholesteryl oleyl carbonate and cholesteryl chloride (50/50 wt. %). The dispersion is placed between circular quartz plates about 1 × 1/8 inch in dimension. The absorption spectrum of the prepared sample is analyzed with a Carey 15 Spectrophotometer. The prepared sample is analyzed with a Carey 61 Spectropolarimeter for circular dichroism. FIG. 1 graphically illustrates the resulting circular dichroism spectrum.

The absorption spectrum shows a major peak at about 580 nm and a shoulder at about 520 nm. The circular dichroism spectrum shows bands of negative sign ($E_R > E_L$) at about 520 nm.

The dispersion was then centrifuged and the dispersed particles thereby separated from the cholesteric mesophase. The cholesteric mesophase was then re-examined spectrophotometrically and shows no absorption or circular dichroism in the visible region of the spectrum. This eliminates the possibility of particles having dissolved in the mesophase and indicates that circular dichroism may rise from a surface effect.

Example I demonstrates that circular dichroism can be induced in insoluble materials by dispersing same in an optically negative liquid crystalline material.

EXAMPLE II

Example I is repeated except that the particles are ground to an average particle size of about 2 microns. The ratio of circular dichroism to optical density is determined to be larger with these about 2 micron particles than with the about 10 micron particles of EXAMPLE I. This buttresses the indication of Example I that the induced circular dichroism in insoluble materials may be a surface phenomenon because the smaller particles present a larger surface area in contact with the optically negative crystalline substance.

Except for the difference in the ratio, the same results are obtained in Example II as are obtained in Example I.

EXAMPLE III

Two samples are prepared as follows: each sample contains the cholesteric mesophase of 60% cholesteryl chloride-40% cholesteryl nonanoate. In sample I, anthracene-9-carboxylic acid dissolved in the mesophase. In sample II, particles of insoluble calcium anthracene-9-carboxylic acid are dispersed in the mesophase. The absorption and circular dichroism spectrums of samples I and II are determined in the manner of Example I. FIG. 2 graphically illustrates the resulting spectra.

The circular dichroism induced in the dissolved acid in sample I changes sign at about 355 nm indicating a change in polarization of the electronic transitions. The dispersed insoluble particles of calcium anthracene-9-carboxylic acid in sample II exhibit induced circular dichroism which does not change sign with polarization of the electronic transition.

The circular dichroism of insoluble particles in sample II exhibits bands which are slightly blue shifted from the absorption bands for the particles. The relative intensities of the circular dichroism bands of the particles in sample II are more similar to the relative intensities of the absorption bands of the dissolved acid in sample I than to those of the absorption bands of the insoluble particles in sample II. The sign of the circular dichroism induced in the insoluble particles of sample II is positive ($E_L > E_R$) and independent of whether $\lambda_o$ for the cholesteric mesophase is at larger or smaller wavelengths than the absorption band of the particles.

The difference in depending upon position of $\lambda_o$ between the dissolved acid in sample I and undissolved particles in sample II indicates a difference in mechanism between induced circular dichroism in solutes and induced circular dichroism in insoluble materials in intimate contact with optically negative liquid crystalline materials.

EXAMPLE IV

Vanadyl phthalocyanine (VOPC) is heated in a vacuum to sublime a film of VOPC upon a quartz disc about 1 inch × 1 × 1/8 inch. The VOPC film is overcoated with a layer of the cholesteric mesophase of cholesteryl oleyl carbonate (COC) which, in turn, is contacted with a glass plate to produce a glass-VOPC-COC-quartz disc sandwich.

The absorption and circular dichroism spectrum of the COC-VOPC combination was examined and circular dichroism was observed in the region of the visible electronic transitions of VOPC. This observation demonstrates that circular dichroism induced in insoluble materials in intimate contact with optically negative liquid crystalline materials is due to specific interaction between the two materials.

EXAMPLE V

Example IV is repeated except that the VOPC is replaced with copper phthalocyanine (CuPC). Circular dichroism is observed in the visible electronic transition of CuPC.

EXAMPLE VI

Example I is followed except that Bonadur Red is replaced by copper phthalocyanine (CuPC).

The absorption spectrum shows major peaks at about 600 nm and about 690 nm. The circular dichroism spectrum shows bands of positive sign ($E_R > E_L$) at about 595 nm and about 680 nm.

The CuPC particles are centrifuged out and the liquid crystalline material re-examined spectrophotometrically; no absorption of circular dichroism in the visible region is exhibited. This eliminates the possibility that circular dichroism was exhibited by dissolved molecules rather than by insoluble particles.

EXAMPLE VII

Particles of calcium anthracene-9-carboxylic acid are dispersed in a supercooled cholesteric mesophase of 60% cholesteryl chloride - 40% cholesteryl nonanoate. The dispersion is sandwiched at a thickness of about 7 microns between two tin-oxide coated quartz discs 1 × 1 × 5/8 inch. A D.C. voltage is applied to the oxide coatings to apply an electric field across the dispersion while the dispersion is being examined for circular dichroism induced in the particles. Upon application of the field, a change in both sign and magnitude of the induced circular dichroism is observed within the absorption bands of the dispersed particles.

The circular dichroism intensity is substantially completely eliminated when the applied voltage is about 400 volts D.C.

Example VII demonstrates that the application of electric fields across cholesteric mesophases in contact with an insoluble material, alters both the sign and magnitude of the induced (extrinsic) circular dichroism.

EXAMPLE VIII

An optical filter for producing circular polarized light from unpolarized or linear polarized light is made as follows: a cholesteric mesophase containing cholesteryl oleyl carbonate (COC) having a $\lambda_o$ at about 340 nm and having uniformly dispersed therein particles of Calcium Bonadur Red is prepared according to Example I.

The optical filter is then placed in the path of a light beam emitted from a broad band unpolarized or linear polarized source of visible radiation such that the incident radiation is normal to the filter. In the region of the absorption bands of the pigment particles a preferential absorption of either left or right-handed circular polarized light occurs depending on the chirality of the optically negative liquid crystal thus resulting in a transmission of one handedness of circularly polarized light. That is to say that a CD band of positive sign [630 nm For Calcium Bonadur Red in (COC)] by convention absorbs LHCPL > RHCPL, i.e., $E_L > E_R$. The light that is transmitted in the region of positive CD bands contains more RHCPL than LHCPL. Light of wavelength outside the region of absorption by the pigment is unaffected and not circularly polarized.

For a greater appreciation of the significance of comparative Example III, above, reference is made to the aforementioned article by F. Saeva appearing in 95 Journal of American Chemical Society, page 7656 (1973); especially, Table I and accompanying text on page 7675 wherein the dependency of liquid crystal induced circular dichroism in solutes upon helix sense of the cholesteric mesophase, upon direction of electronic transition moments of solute and upon cholesteric mesophase pitch band $\lambda_o$ position relative to wavelength of absorption of solute, is discussed in detail. That article is hereby incorporated by reference.

It will be appreciated, of course, that all embodiments of the invention herein described can be used with or without application of an electrical or magnetic field, and that such usage may include selective application of an electrical or magnetic field with regard to time of application, duration of application, and area of application. It is noted that the application of electrical field strength at or above that causing transition of the liquid crystalline material from optically negative characteristics to optically positive characteristics destroys the circular dichroism induced in extrinsically optically active materials in contact with the liquid crystalline materials.

Figure 3:
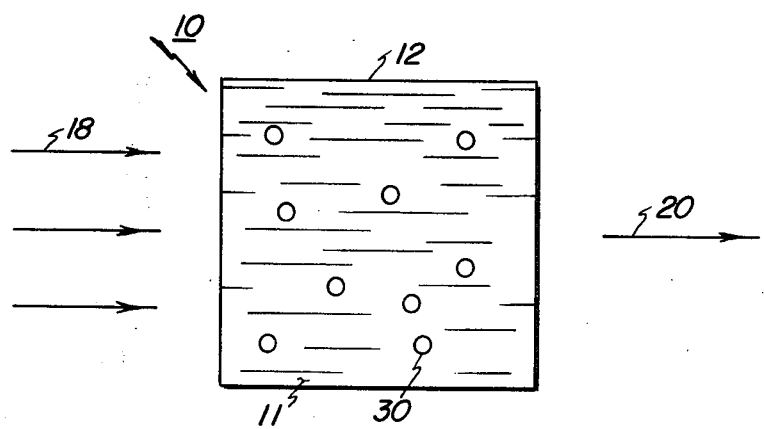
FIG. 3 is a schematic side cross-sectional view of a typical optical filter constructed according to the invention.

FIG. 3 schematically depicts one embodiment of the invention used as an optical filter for producing circular polarized light, generally designated 10. Liquid crystalline films 11 having particles 30 of insoluble material dispersed therein is enclosed in optional protective outer causing 12. incident radiation 18 preferably reaches the optical filter 10 at normal incidence, with beam 20 emerging from the filter.

In order to take advantage of the circular dichroism induced in the particles 30, incident light radiation should, of course, include light radiation having wavelengths within the absorption band of the insoluble material of particles 30.

Protective outer casing 12 may comprise any suitable material, flexible or rigid, which is optically isotropic and transparent to the incident light radiation and which is non-reactive with the liquid crystalline film. Typical suitable materials include glass, fused silica and any other materials having the required characteristics.

The optical filter, generally speaking, is utilized for producing radiation which is circularly polarized. According to the present invention, any number of liquid crystal films comprising optically negative liquid crystalline substances to which an extrinsically optically active insoluble material has been added can be used to produce circularly polarized light resulting from the induced CD in the pigment particles, or, preferably, a single film of an optically negative liquid crystalline composition itself containing any number of extrinsically optically active insoluble materials may be utilized. Devices constructed in this manner will transmit a spectral band of circularly polarized light which coincides with the induced circularly dichroic absorption band of each different insoluble material as well as a spectral band centered about the $\lambda_o$ value of each different liquid crystal substance. Thus, in a particular preferred embodiment, a composition exhibiting a plurality of different induced circularly dichroic absorption bands, e.g., three, which could be selected to span the visible spectrum and having a pitch band outside the visible region is formed. When employed as described above with white light, such a composition can provide a three-color CP light source suitable for color imaging systems such as color xerography, photoelectrophoretic color imaging which is described in detail in U.S. Pat. Nos. 3,384,565; 3,384,566; 3,383,993 and 3,384,488 or for use in color display systems. Devices arranged to function as described above have the important advantage that the transmitted beam is essentially independent of the presence of various foreign stimuli to which the pitch band of the optically negative crystalline substance is sensitive. In other words, the position of the transmitted bands does not change to any substantial extent as the levels of foreign stimuli present vary although the amplitude of the transmitted band will vary as has been described in detail above. Of course, it may be desired in certain instances to utilize the transmitted pitch band as well as the transmitted induced circularly dichroic absorption bands of any particular composition or compositions.

Figure 4:
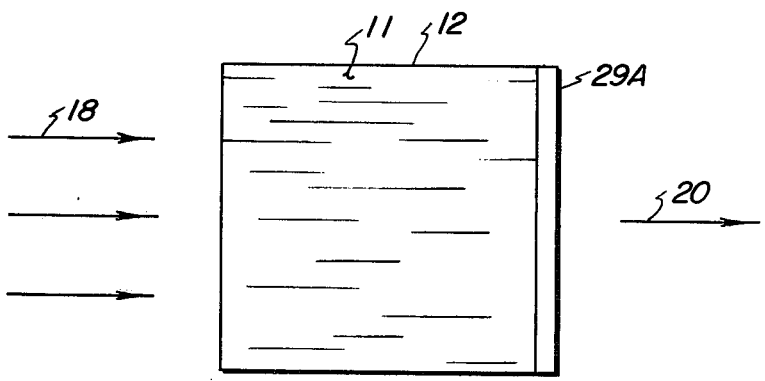
FIG. 4 is a schematic side cross-sectional view of another embodiment according to the invention.

FIG. 4 schematically illustrates another embodiment of the invention wherein the insoluble materials in which circular dichroism is induced is in contact with an optically negative liquid crystalline film but not in suspension in the liquid crystalline film. The insoluble material need only be in intimate contact with the liquid crystalline material because the phenomena of induced circular dichroism is indicated as occurring at the surface of the insoluble material, as illustrated in the Examples. In FIG. 4, the film of negative liquid crystalline material is in intimate contact with film 29A of insoluble material.

Any of the aforementioned insoluble materials may be used and may be coated upon a suitable substrate such as glass, thin quartz and protective outer casing 12. Any suitable method of forming a coating of insoluble material may be used. For example, sublimation by heating the insoluble material in a vacuum can be employed.

While the invention has been described in detail with respect to various preferred embodiments thereof, it is not intended to be limited thereto but rather it will be appreciated by those skilled in the art that modifications and variations are possible which are within the spirit of the invention and the scope of the claims.

What is claimed is:

1. A method for producing circularly polarized light of desired wavelengths of incident radiation while not affecting all other wavelengths of the incident radiation comprising:
   a. providing a light source;
   b. providing an optical filter comprising at least one film of an optically negative liquid crystalline material having a reflection band with center wavelength $\lambda_o$ and exhibiting reflective circularly dichroic behavior; said optically negative liquid crystalline film having dispersed therein an insoluble material; said insoluble material when dispersed in said optically negative liquid crystalline material becoming extrinsically optically active and having a light absorption band outside said reflection band within which circular dichroism is induced; and
   c. directing a beam of radiation from said light source upon said optical filter thereby providing an emergent light beam containing a wavelength band of circularly polarized light corresponding to the absorption band of said insoluble material; wherein said insoluble material is selected from the group consisting of non-polymeric aromatic compounds; azo compounds; nitro compounds; nitroso compounds; anyl compounds; carbonyl compounds; thiocarbonyl compounds; alkenes; heterocyclic compounds; and mixtures thereof.

2. The method as defined in claim 1 wherein said liquid crystal film is from about 0.5 to about 50 microns in thickness.

3. The method as defined in claim 1 wherein said light absorption band of at least one said extrinsically optically active material is in the visible region of the electromagnetic spectrum.

4. The method as defined in claim 1 wherein the insoluble material content of said liquid crystalline film comprises up to about 90% by weight.

5. The method as defined in claim 1 wherein said dispersed insoluble material is selected from the group consisting of the calcium salt of 3'-ethyl-4'-chloro-6'-sulfonylphenylazo-2-hydroxy-3-naphthoic acid and calcium anthracene-9-carboxylic acid.

6. The method as defined in claim 1 further including the step of applying an electrical field across said liquid crystalline material; said electrical field being insufficient to extinguish said circular dichroism in said light absorption band.

7. A method of producing circularly polarized light of desired wavelengths of incident radiation while not affecting all other wavelengths of the incident radiation, comprising:
   a. providing a light source;
   b. providing an optical filter comprising at least one film of an optically negative liquid crystalline material having a reflection band with center wavelength $\lambda_o$ and exhibiting reflective circularly dichroic behavior; said optically negative liquid crystalline material being in contact with a layer of insoluble material; said insoluble material when in contact with said optically negative liquid crystalline material becoming extrinsically optically active and having a light absorption band outside said reflection band within which circular dichroism is induced; and
   c. directing a beam of radiation from said light source upon said optical filter thereby providing an emergent light beam containing a wavelength band of circularly polarized light corresponding to the absorption band of said insoluble material.

8. The method as defined in claim 7 wherein said liquid crystal film is from about 0.5 to about 50 microns in thickness.

9. The method as defined in claim 7 wherein said light absorption band of said insoluble material is in the visible region of the electromagnetic spectrum.

10. The method as defined in claim 7 further including the step of applying an electrical field across said layer of liquid crystalline material and said layer of insoluble material; said electrical field being applied at a level insufficient to extinguish the circular dichroism induced in said light absorption band.

11. The method as defined in claim 7 wherein said insoluble material is selected from the group consisting of vanadyl phthalocyanine and copper phthalocyanine.

* * * * *